(12) United States Patent
Takeuchi et al.

(10) Patent No.: US 11,947,068 B2
(45) Date of Patent: Apr. 2, 2024

(54) ELECTROMAGNETIC WAVE DETECTION APPARATUS AND INFORMATION ACQUISITION SYSTEM

(71) Applicant: KYOCERA Corporation, Kyoto (JP)

(72) Inventors: Eri Takeuchi, Yokohama (JP); Hiroki Okada, Machida (JP)

(73) Assignee: KYOCERA Corporation, Kyoto (JP)

( * ) Notice: Subject to any disclaimer, the term of this patent is extended or adjusted under 35 U.S.C. 154(b) by 772 days.

(21) Appl. No.: 17/046,337

(22) PCT Filed: Apr. 2, 2019

(86) PCT No.: PCT/JP2019/014633
§ 371 (c)(1),
(2) Date: Oct. 9, 2020

(87) PCT Pub. No.: WO2019/198568
PCT Pub. Date: Oct. 17, 2019

(65) Prior Publication Data
US 2021/0033744 A1 Feb. 4, 2021

(30) Foreign Application Priority Data

Apr. 13, 2018 (JP) .................. 2018-077530

(51) Int. Cl.
*G01V 3/12* (2006.01)
*G01S 17/89* (2020.01)
(Continued)

(52) U.S. Cl.
CPC ............... *G01V 3/12* (2013.01); *G01S 17/89* (2013.01); *G02B 26/0833* (2013.01); *G02B 26/105* (2013.01); *H04N 5/33* (2013.01)

(58) Field of Classification Search
None
See application file for complete search history.

(56) References Cited

U.S. PATENT DOCUMENTS 6,686,602 B2   2/2004   Some
7,477,361 B2   1/2009   Murayama
(Continued)

FOREIGN PATENT DOCUMENTS

JP   2005535869 A   11/2005
JP   2008046047 A   2/2008
(Continued)

*Primary Examiner* — Jas A Sanghera
(74) *Attorney, Agent, or Firm* — Studebaker & Brackett PC (57) ABSTRACT

An electromagnetic wave detection apparatus (10) includes a separation unit (16), first detector (17), propagation unit (18), second detector (20), and blocker (21). The separation unit (16) separates electromagnetic waves propagating in a first direction (d1) and propagates the electromagnetic waves in a second direction (d2) and a third direction (d3). The first detector (17) detects electromagnetic waves propagated in the second direction (d2). The propagation unit (18) includes pixels (px) along a reference surface (ss). The propagation unit (18) switches the propagation direction of electromagnetic waves propagated in the third direction (d3) and incident on the reference surface (ss) between a fourth direction (d4) and a fifth direction (d5) at each pixel (px). The second detector (20) detects the electromagnetic waves propagated in the fourth direction (d4). The blocker (21) blocks at least a portion of the electromagnetic waves propagated in the fifth direction (d5).

12 Claims, 6 Drawing Sheets

(51) Int. Cl.
*G02B 26/08* (2006.01)
*G02B 26/10* (2006.01)
*H04N 5/33* (2023.01)

(56) References Cited

U.S. PATENT DOCUMENTS

| | | |
|---|---|---|
| 2003/0132405 A1 | 7/2003 | Some |
| 2008/0043218 A1 | 2/2008 | Murayama |
| 2014/0240721 A1 | 8/2014 | Herschbach |
| 2014/0300718 A1* | 10/2014 | Krattiger .............. H04N 13/257 348/370 |
| 2017/0363741 A1* | 12/2017 | Send .................... G01S 7/4816 |

FOREIGN PATENT DOCUMENTS

| | | |
|---|---|---|
| JP | 2011220732 A | 11/2011 |
| JP | 2013-180120 A | 9/2013 |
| JP | 2014-185917 A | 10/2014 |
| JP | 2015175629 A | 10/2015 |
| JP | 2017124790 A | 7/2017 |
| WO | 2016/039053 A1 | 3/2016 |

* cited by examiner

ELECTROMAGNETIC WAVE DETECTION APPARATUS AND INFORMATION ACQUISITION SYSTEM

CROSS-REFERENCE TO RELATED APPLICATION

The present application claims priority to and the benefit of Japanese Patent Application No. 2018-77530 filed Apr. 13, 2018, the entire contents of which are incorporated herein by reference.

TECHNICAL FIELD

The present disclosure relates to an electromagnetic wave detection apparatus and an information acquisition system.

BACKGROUND

In recent years, apparatuses have been developed to acquire information related to the surroundings from the results of detection by a plurality of detectors that detect electromagnetic waves. For example, an apparatus that uses laser radar to measure the position of an object in an image captured by an infrared camera is known, as in patent literature (PTL) 1.

CITATION LIST

Patent Literature

PTL 1: JP 2011-220732 A

SUMMARY

An electromagnetic wave detection apparatus according to a first aspect includes:
- a separation unit configured to separate electromagnetic waves propagating in a first direction and propagate the electromagnetic waves in a second direction and a third direction;
- a first detector configured to detect the electromagnetic waves propagated in the second direction;
- a propagation unit including a plurality of pixels arranged along a reference surface, the propagation unit being configured to switch a propagation direction of electromagnetic waves that are propagated in the third direction and are incident on the reference surface between a fourth direction and a fifth direction at each pixel;
- a second detector configured to detect the electromagnetic waves propagated in the fourth direction; and
- a blocker configured to block at least a portion of the electromagnetic waves propagated in the fifth direction.

An information acquisition system according to a second aspect includes:
- an electromagnetic wave detection apparatus including a separation unit configured to separate electromagnetic waves propagating in a first direction and propagate the electromagnetic waves in a second direction and a third direction, a first detector configured to detect the electromagnetic waves propagated in the second direction, a propagation unit including a plurality of pixels arranged along a reference surface, the propagation unit being configured to switch a propagation direction of electromagnetic waves that are propagated in the third direction and are incident on the reference surface between a fourth direction and a fifth direction at each pixel, a second detector configured to detect the electromagnetic waves propagated in the fourth direction, and a blocker configured to block at least a portion of the electromagnetic waves propagated in the fifth direction; and
- a controller configured to acquire information related to surroundings based on an electromagnetic wave detection result by the first detector and the second detector.

DETAILED DESCRIPTION

Embodiments of an electromagnetic wave detection apparatus to which the present disclosure is applied are described below with reference to the drawings. In a configuration for detecting electromagnetic waves with a plurality of detectors that each detect electromagnetic waves, an optical system is formed so that from among the electromagnetic waves incident on the apparatus, electromagnetic waves of a wavelength band allocated to each detector as a detection target are incident on the corresponding detector. At this time, electromagnetic waves of a wavelength band other than the allocated band are sometimes incident on at least one of the detectors. This may reduce the detection accuracy of electromagnetic waves. An electromagnetic wave detection apparatus to which the present disclosure is applied is configured to reduce the amount of electromagnetic waves of a wavelength band other than the allocated band that are incident on at least one of the detectors, thereby enabling increased detection accuracy of electromagnetic waves of the wavelength band allocated to the detector.

Figure 1:
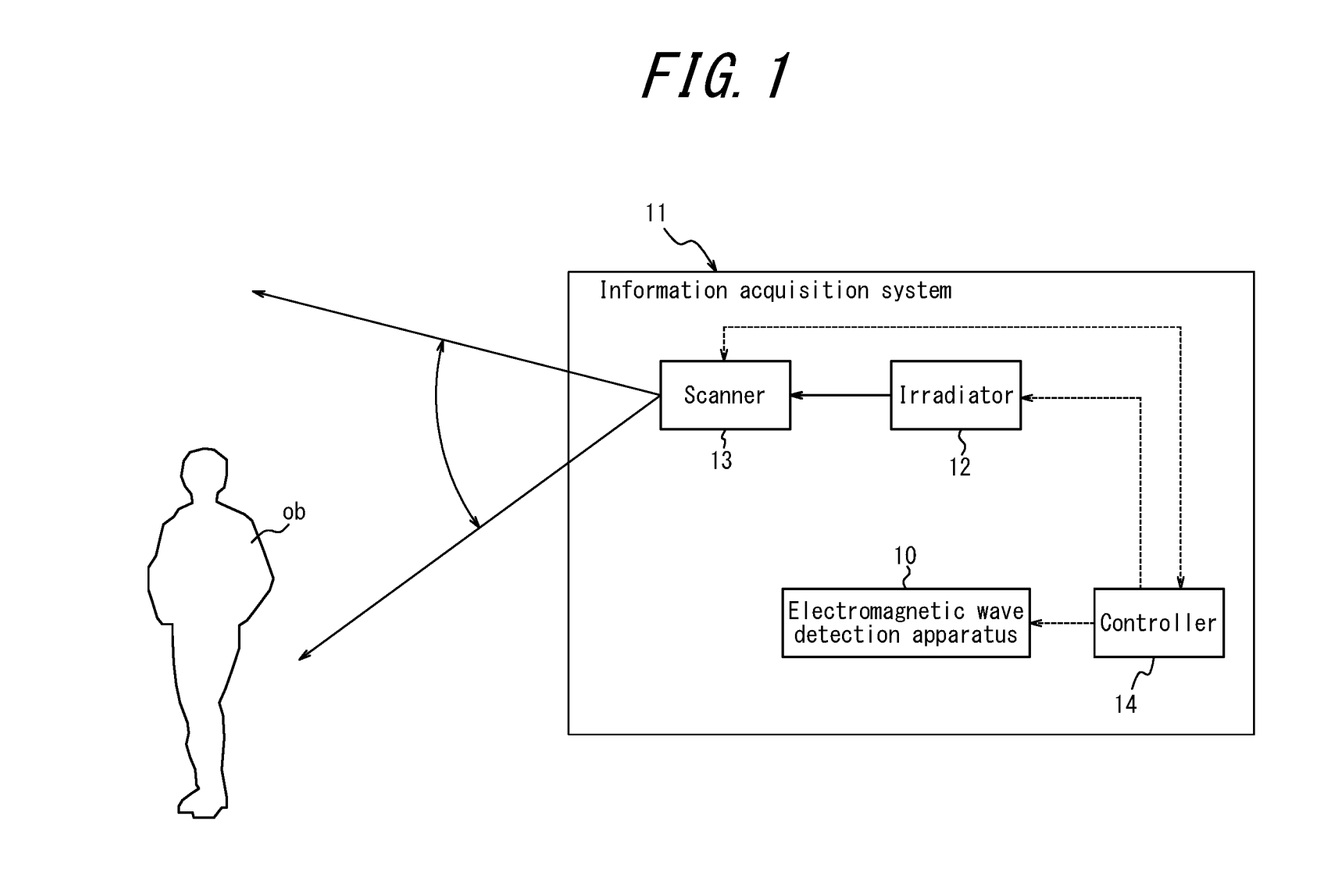
FIG. 1 is a configuration diagram schematically illustrating an information acquisition system that includes an electromagnetic wave detection apparatus according to a first embodiment.

As illustrated in FIG. 1, an information acquisition system 11 that includes an electromagnetic wave detection apparatus 10 according to a first embodiment of the present disclosure is configured to include the electromagnetic wave detection apparatus 10, an irradiator 12, a scanner 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

Figure 2:
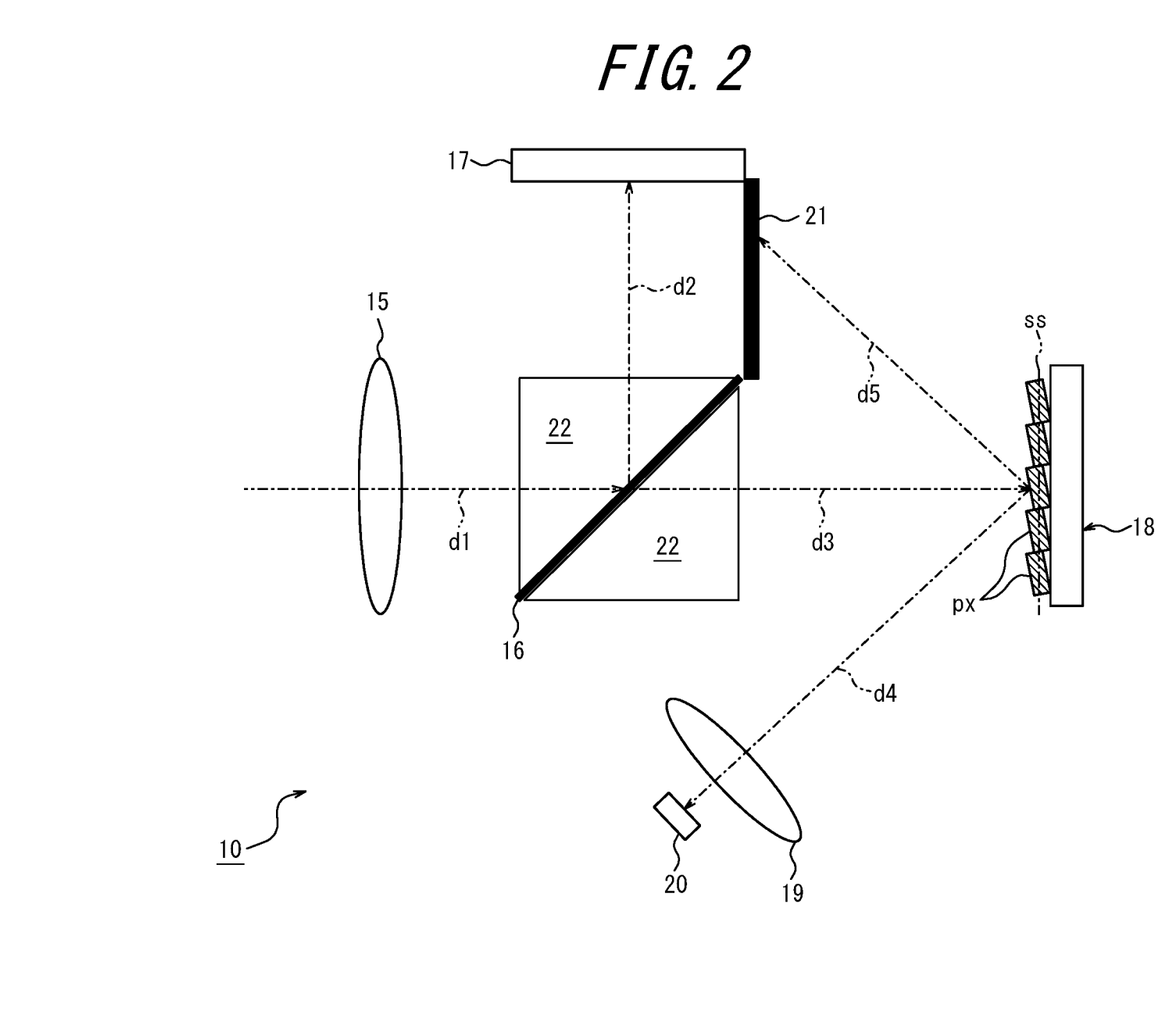
FIG. 2 is a configuration diagram schematically illustrating the electromagnetic wave detection apparatus of FIG. 1.

As illustrated in FIG. 2, the electromagnetic wave detection apparatus 10 includes a pre-stage optical system 15, a separation unit 16, a first detector 17, a propagation unit 18, a post-stage optical system 19, a second detector 20, and a blocker 21.

The pre-stage optical system 15 includes either or both of a lens and a mirror, for example, and forms an image of an object ob that becomes a subject of imaging.

The separation unit 16 is disposed between the pre-stage optical system 15 and a primary image formation position, which is the position where the image of the object ob located at a predetermined position separate from the pre-stage optical system 15 is formed by the pre-stage optical system 15.

The separation unit 16 separates electromagnetic waves propagating in the first direction d1 and propagates the electromagnetic waves in a second direction d2 and a third direction d3. The first direction d1 is, for example, parallel to the optical axis of the pre-stage optical system 15. The separation unit 16 may also cause a portion of the electromagnetic waves propagating in the first direction d1 to propagate in the second direction d2 and cause another portion of the electromagnetic waves to propagate in the third direction d3. The portion of the electromagnetic waves propagated in the second direction d2 may be electromagnetic waves of a particular wavelength among the electromagnetic waves propagating in the first direction d1, and the electromagnetic waves propagated in the third direction d3 may be electromagnetic waves of a different wavelength.

For example, the separation unit 16 may propagate electromagnetic waves in the visible light band in the second direction d2 and propagate electromagnetic waves in the infrared band in the third direction d3. Conversely, the separation unit 16 may propagate electromagnetic waves in the infrared band in the second direction d2 and propagate electromagnetic waves in the visible light band in the third direction d3. The separation unit 16 may propagate electromagnetic waves with a long wavelength in the second direction d2 and propagate electromagnetic waves with a short wavelength in the third direction d3. Conversely, the separation unit 16 may propagate electromagnetic waves with a short wavelength in the second direction d2 and propagate electromagnetic waves with a long wavelength in the third direction d3.

In the first embodiment, the separation unit 16 reflects a portion of the electromagnetic waves propagating in the first direction d1 and transmits another portion of the electromagnetic waves in the third direction d3. The separation unit 16 may transmit a portion of the electromagnetic waves propagating in the first direction d1 in the first direction d2 and transmit another portion of the electromagnetic waves in the third direction d3. The separation unit 16 may also refract a portion of the electromagnetic waves propagating in the first direction d1 in the second direction d2 and refract another portion of the electromagnetic waves in the third direction d3. The separation unit 16 includes any of a visible light reflective coating deposited on a prism 22, a one-way mirror, a beam splitter, a dichroic mirror, a cold mirror, a hot mirror, a metasurface, or a deflection element, for example.

The first detector 17 is disposed along the path traveled by electromagnetic waves from the separation unit 16 in the second direction d2. Furthermore, the first detector 17 is disposed at or near an image formation position, which is a position in the second direction d2 from the separation unit 16 where the image of the object ob located at a predetermined position separate from the pre-stage optical system 15 is formed by the pre-stage optical system 15. The first detector 17 detects the electromagnetic waves propagated from the separation unit 16 in the second direction d2.

In the first embodiment, the first detector 17 is a passive sensor. In greater detail, the first detector 17 in the first embodiment includes a device array. For example, the first detector 17 includes an imaging device such as an image sensor or an imaging array, captures the image formed from electromagnetic waves at a detection surface, and generates image information corresponding to the imaged object ob.

In greater detail, the first detector 17 in the first embodiment captures a visible light image. The first detector 17 transmits the generated image information to the controller 14 as a signal.

The first detector 17 may capture an image other than a visible light image, such as an image of infrared light, ultraviolet light, and radio waves. The first detector 17 may include a ranging sensor. In this configuration, the electromagnetic wave detection apparatus 10 can acquire distance information in image form with the first detector 17. The first detector 17 may include a thermosensor or the like. In this configuration, the electromagnetic wave detection apparatus 10 can acquire temperature information in image form with the first detector 17.

The propagation unit 18 is disposed along the path over which electromagnetic waves propagate from the separation unit 16 in the third direction d3. Furthermore, the propagation unit 18 is disposed at or near a primary image formation position, which is a position in the third direction d3 from the separation unit 16 where the image of the object ob located at a predetermined position separate from the pre-stage optical system 15 is formed by the pre-stage optical system 15.

In the first embodiment, the propagation unit 18 is disposed at the image formation position. The propagation unit 18 comprises a reference surface ss on which electromagnetic waves that pass through the pre-stage optical system 15 and the separation unit 16 are incident. The reference surface ss is formed by a plurality of pixels px aligned in two dimensions. The reference surface ss is a surface that, in at least one of the first state and the second state described below, produces effects on the electromagnetic waves such as reflection and transmission.

The propagation unit 18 can switch each pixel px between a first state of propagating the electromagnetic waves that are propagated in the third direction d3 and are incident on the reference surface ss in a fourth direction d4 and a second state of propagating the electromagnetic waves in a fifth direction d5. In the first embodiment, the first state is a first reflecting state of reflecting the electromagnetic waves incident on the reference surface ss in the fourth direction d4. The second state is a second reflecting state of reflecting the electromagnetic waves incident on the reference surface ss in the fifth direction d5.

In greater detail, the propagation unit 18 of the first embodiment includes a reflecting surface that reflects the electromagnetic waves on each pixel px. The propagation unit 18 switches each pixel px between the first reflecting state and the second reflecting state by changing the orientation of the reflecting surface for each pixel px.

In the first embodiment, the propagation unit 18 includes a digital micro mirror device (DMD), for example. The DMD can drive minute reflecting surfaces that configure the reference surface ss to switch the reflecting surface on each pixel px between inclined states of +12 degrees and −12 degrees relative to the reference surface ss. The reference surface ss is parallel to the board surface of a substrate on which the minute reflecting surfaces are mounted in the DMD.

Figure 3:
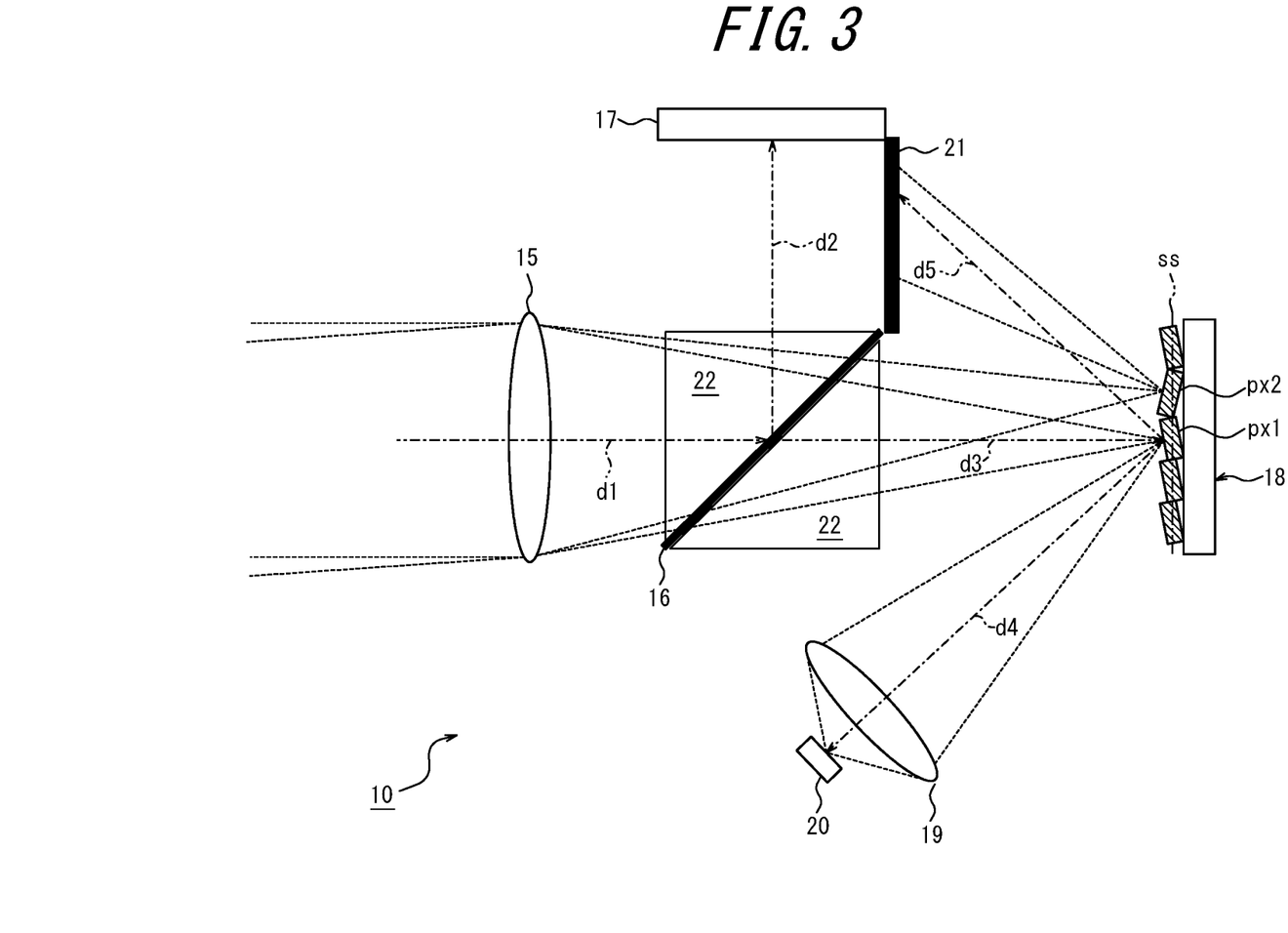
FIG. 3 is a state diagram of the electromagnetic wave detection apparatus to illustrate the propagation direction of electromagnetic waves in a first state and a second state of pixels in the propagation unit of FIG. 2.

The propagation unit 18 switches each pixel px between the first state and the second state in response to control by the controller 14, described below. For example, as illustrated in FIG. 3, the propagation unit 18 can simultaneously propagate electromagnetic waves incident on a portion of pixels px1 in the fourth direction d4 by switching the pixels px1 to the first state. The propagation unit 18 can also propagate electromagnetic waves incident on another portion of pixels px2 in the fifth direction d5 by switching the pixels px2 to the second state.

As illustrated in FIG. 2, the post-stage optical system 19 is disposed in the fourth direction d4 from the propagation unit 18. The post-stage optical system 19 includes either or both of a lens and a mirror, for example. The post-stage optical system 19 forms an image of the object ob represented by the electromagnetic waves whose propagation direction is switched at the propagation unit 18.

The second detector 20 is disposed along the path of electromagnetic waves that propagate through the post-stage optical system 19 after propagating in the fourth direction d4 due to the propagation unit 18. The second detector 20 detects electromagnetic waves that pass through the post-stage optical system 19, i.e. electromagnetic waves propagated in the fourth direction d4.

In the first embodiment, the second detector 20 is an active sensor that detects reflected waves resulting from reflection, by the object ob, of electromagnetic waves emitted towards the object ob from the irradiator 12. The second detector 20 in the first embodiment detects reflected waves, reflected by the object ob, of electromagnetic waves emitted towards the object ob after being emitted from the irradiator 12 and reflected by the scanner 13. As described below, the electromagnetic waves emitted from the irradiator 12 are at least one of infrared rays, visible light rays, ultraviolet rays, and radio waves. The second detector 20 detects either a different type or the same type of electromagnetic waves as the first detector 17.

In the first embodiment, the second detector 20 may be a different type or the same type of sensor as the first detector 17. In greater detail, the second detector 20 of the first embodiment includes a device configured as a ranging sensor. For example, the second detector 20 includes a single device such as an Avalanche PhotoDiode (APD), a PhotoDiode (PD), or a ranging image sensor. The second detector 20 may include a device array, such as an APD array, a PD array, a ranging imaging array, or a ranging image sensor.

The second detector 20 of the first embodiment transmits detection information, indicating the detection of reflected waves from the subject, to the controller 14 as a signal. In greater detail, the second detector 20 detects electromagnetic waves in the infrared light band.

It suffices for the single device configured as the above-described ranging sensor in second detector 20 to be capable of detecting electromagnetic waves. The electromagnetic waves do not need to form an image at the detection surface. The second detector 20 therefore need not be disposed at a secondary image formation position, which is a position of image formation by the post-stage optical system 19. In other words, as long as electromagnetic waves from all angles of view can be incident on the detection surface, the second detector 20 with this configuration may be disposed at any position along the path of electromagnetic waves that are propagated in the fourth direction d4, due to the propagation unit 18, and subsequently pass through the post-stage optical system 19.

The blocker 21 may, for example, be disposed on the path of electromagnetic waves propagated in the fifth direction d5 from the propagation unit 18. The blocker 21 blocks at least a portion of the electromagnetic waves propagated in the fifth direction d5. The blocker 21 may be disposed on the path between the propagation unit 18 that propagates the electromagnetic waves in the fifth direction d5 and the first detector 17. The blocker 21 may be disposed outside of the path over which electromagnetic waves propagate from the separation unit 16 in the second direction d2.

The blocker 21 blocks propagation towards the first detector 17 of at least a portion of the electromagnetic waves propagated in the fifth direction d5 from the propagation unit 18 by absorbing, reflecting, or scattering the electromagnetic waves. In a configuration such that the separation unit 16 propagates electromagnetic waves of a particular wavelength in the second direction d2 and propagates electromagnetic waves of other wavelengths in the third direction d3, the blocker 21 may block electromagnetic waves of a different wavelength than the electromagnetic waves propagated in the second direction d2. The blocker 21 in this configuration may block only electromagnetic waves of a different wavelength than the electromagnetic waves propagated in the second direction d2. The blocker 21 in this configuration may transmit or refract electromagnetic waves of the same wavelength as the electromagnetic waves propagated in the second direction d2. The blocker 21 in this configuration may transmit or refract only electromagnetic waves of the same wavelength as the electromagnetic waves propagated in the second direction d2.

In FIG. 1, the irradiator 12 emits at least one of infrared rays, visible light rays, ultraviolet rays, and radio waves. In the first embodiment, the irradiator 12 emits infrared rays. The irradiator 12 emits the electromagnetic waves towards the object ob either indirectly via the scanner 13 or directly. In the first embodiment, the irradiator 12 emits the electromagnetic waves towards the object ob indirectly via the scanner 13.

In the first embodiment, the irradiator 12 emits a narrow beam, for example 0.5 degrees, of electromagnetic waves. In the first embodiment, the irradiator 12 is capable of emitting pulses of electromagnetic waves. For example, the irradiator 12 includes a light emitting diode (LED), laser diode (LD), or the like. The irradiator 12 switches between emitting and not emitting electromagnetic waves based on control by the controller 14, described below.

The scanner 13 includes a reflecting surface that reflects electromagnetic waves, for example, and changes the irradiation position of electromagnetic waves emitted towards the object ob by reflecting the electromagnetic waves emitted from the irradiator 12 while changing the orientation of the reflecting surface. In other words, the scanner 13 scans the object ob using the electromagnetic waves emitted from the irradiator 12. Accordingly, the second detector 20 in the first embodiment works together with the scanner 13 to form a scanning-type ranging sensor. The scanner 13 scans the object ob one- or two-dimensionally. In the first embodiment, the scanner 13 scans the object ob two-dimensionally.

The scanner 13 is configured so that at least a portion of an irradiation region of the electromagnetic waves that are emitted by the irradiator 12 and reflected is included in an electromagnetic wave detection range of the electromagnetic wave detection apparatus 10. Accordingly, at least a portion of the electromagnetic waves emitted onto the object ob via the scanner 13 can be detected by the electromagnetic wave detection apparatus 10.

In the first embodiment, the scanner 13 is configured so that at least a portion of the irradiation region of the electromagnetic waves that are emitted by the irradiator 12 and reflected by the scanner 13 is included in the detection range of the second detector 20. Accordingly, in the first embodiment, at least a portion of the electromagnetic waves emitted onto the object ob via the scanner 13 can be detected by the second detector 20.

The scanner 13 may, for example, include a micro electro mechanical systems (MEMS) mirror, a polygon mirror, a galvano mirror, or the like. In the first embodiment, the scanner 13 includes a MEMS mirror.

Based on control by the controller 14, described below, the scanner 13 changes the direction in which electromagnetic waves are reflected. The scanner 13 may include an angle sensor, such as an encoder, and may notify the controller 14 of the angle detected by the angle sensor as information on the direction in which electromagnetic waves are reflected (direction information). This configuration allows the controller 14 to calculate the irradiation position based on the direction information acquired from the scanner 13. The controller 14 can also calculate the irradiation position based on a drive signal inputted to the scanner 13 to change the direction in which electromagnetic waves are reflected.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) that comprises one processor or a plurality of processors working together and a system-in-a-package (SiP).

The controller 14 acquires information related to the surroundings of the electromagnetic wave detection apparatus 10 based on electromagnetic waves detected by each of the first detector 17 and the second detector 20. The information related to the surroundings may, for example, be image information, distance information, and temperature information. In the first embodiment, the controller 14 acquires image information in the form of electromagnetic waves detected as an image by the first detector 17, as described above. Based on the detection information detected by the second detector 20, the controller 14 in the first embodiment also uses the time-of-flight (ToF) method to acquire distance information of the irradiation position irradiated by the irradiator 12.

Figure 4:
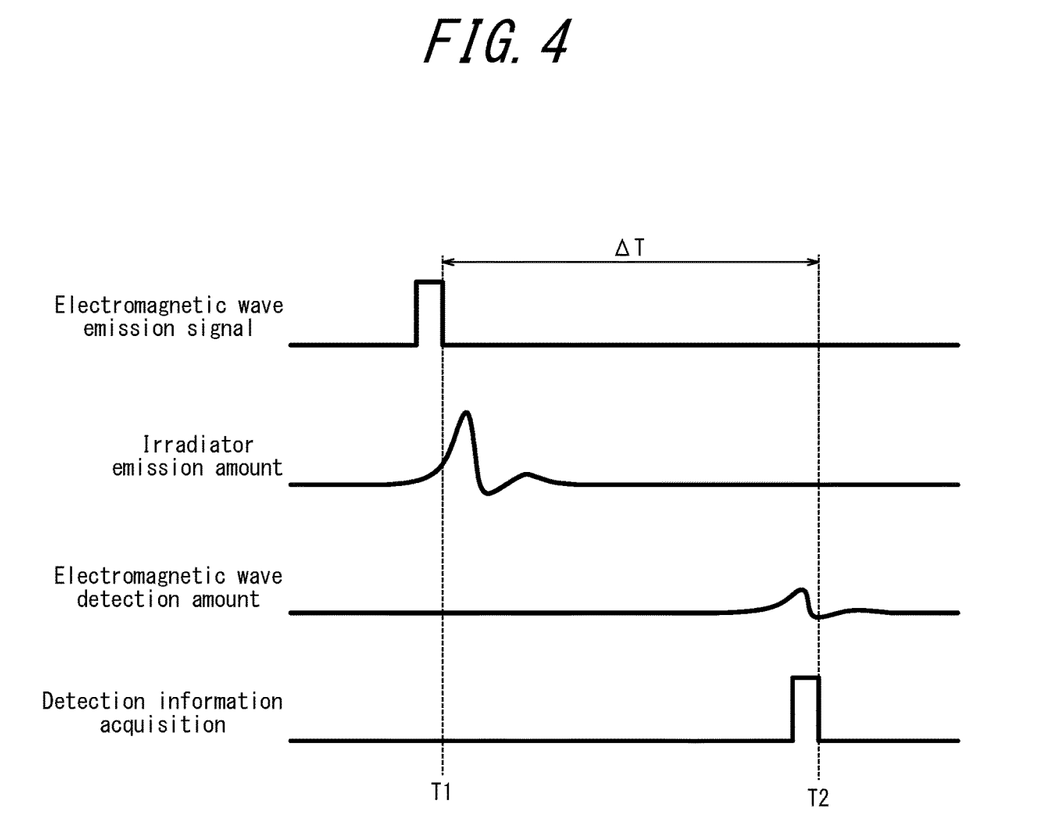
FIG. 4 is a timing chart of the timing of emission and detection of electromagnetic waves to illustrate the principle of ranging by a ranging sensor configured by an irradiator, a second detector, and a controller 14 of FIG. 1.

As illustrated in FIG. 4, the controller 14 causes the irradiator 12 to emit pulses of electromagnetic waves by inputting an electromagnetic wave emission signal to the irradiator 12 (see the "electromagnetic wave emission signal" section). The irradiator 12 emits electromagnetic waves based on the inputted electromagnetic wave emission signal (see the "irradiator emission amount" section). The electromagnetic waves emitted by the irradiator 12 and reflected by the scanner 13 to be irradiated on an arbitrary irradiation region are reflected in the irradiation region. The controller 14 switches at least a portion of the pixels px, in an image formation region in the propagation unit 18 where reflected waves in the irradiation region are formed into an image by the pre-stage optical system 15, to the first state and switches the other pixels px to the second state. The second detector 20 then notifies the controller 14 of detection information, as described above, when detecting electromagnetic waves reflected in the irradiation region (see the "electromagnetic wave detection amount" section).

The controller 14 may, for example, include a time measurement large scale integrated circuit (LSI) and measure a time $\Delta T$ from a timing T1 at which the controller 14 caused the irradiator 12 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position. As described above, the controller 14 calculates the irradiation position based on the direction information acquired from the scanner 13 or the drive signal that the controller 14 outputs to the scanner 13. By changing the irradiation position while calculating the distance to each irradiation position, the controller 14 creates distance information in image form.

In the first embodiment, the information acquisition system 11 is configured to create distance information by direct ToF, in which the time from when laser light is emitted until the laser light returns is directly measured, as described above. The information acquisition system 11 is not, however, limited to this configuration. For example, the information acquisition system 11 may create distance information by flash ToF, in which electromagnetic waves are emitted with a constant period, and the time until return is measured indirectly from the phase difference between the emitted electromagnetic waves and the returning electromagnetic waves. The information acquisition system 11 may also create distance information by another ToF method, such as phased ToF.

The electromagnetic wave detection apparatus 10 of the first embodiment with the above-described configuration includes the blocker 21 that blocks at least a portion of the electromagnetic waves that are propagated in the third direction d3 by the separation unit 16 and then propagated in the fifth direction by the propagation unit 18. This configuration enables the electromagnetic wave detection apparatus 10 to reduce the amount of electromagnetic waves incident on the first detector 17 in a wavelength band other than the band allocated to the first detector 17 as a detection target. The electromagnetic wave detection apparatus 10 can therefore increase the detection accuracy of electromagnetic waves of the wavelength band allocated to the first detector 17. The effects of such a configuration are the same for the electromagnetic wave detection apparatus of the second embodiment, described below.

The electromagnetic wave detection apparatus 10 of the first embodiment separates electromagnetic waves propagating in the first direction d1 and propagates the electromagnetic waves in the second direction d2 and the third direction d3. The electromagnetic wave detection apparatus 10 can switch the propagation direction of the electromagnetic waves propagated in the third direction d3 to the fourth direction d4. This configuration allows the electromagnetic wave detection apparatus 10 to match the optical axis of the pre-stage optical system 15 to the central axis of the electromagnetic waves propagated in the second direction d2 and to the central axis of the electromagnetic waves propagated in the fourth direction d4. The electromagnetic wave detection apparatus 10 can therefore reduce the misalignment of the optical axes of the first detector 17 and the second detector 20. The electromagnetic wave detection apparatus 10 can thereby reduce the misalignment between axes that traverse the center of the detection surface of each of the first detector 17 and the second detector 20 and are perpendicular to the detection surfaces. Hence, the electromagnetic wave detection apparatus 10 can reduce the misalignment of coordinate systems in the detection results of the first detector 17 and the second detector 20. The effects of such a configuration are the same for the electromagnetic wave detection apparatus of the second embodiment, described below.

The electromagnetic wave detection apparatus 10 of the first embodiment can switch a portion of the pixels px in the propagation unit 18 to the first state and switch another portion of the pixels px to the second state. This configuration allows the electromagnetic wave detection apparatus 10 to detect, using the second detector 20, information based on the electromagnetic waves at each portion of the object ob that emits the electromagnetic waves incident on the pixels px. The effects of such a configuration are the same for the electromagnetic wave detection apparatus of the second embodiment, described below.

Figure 5:
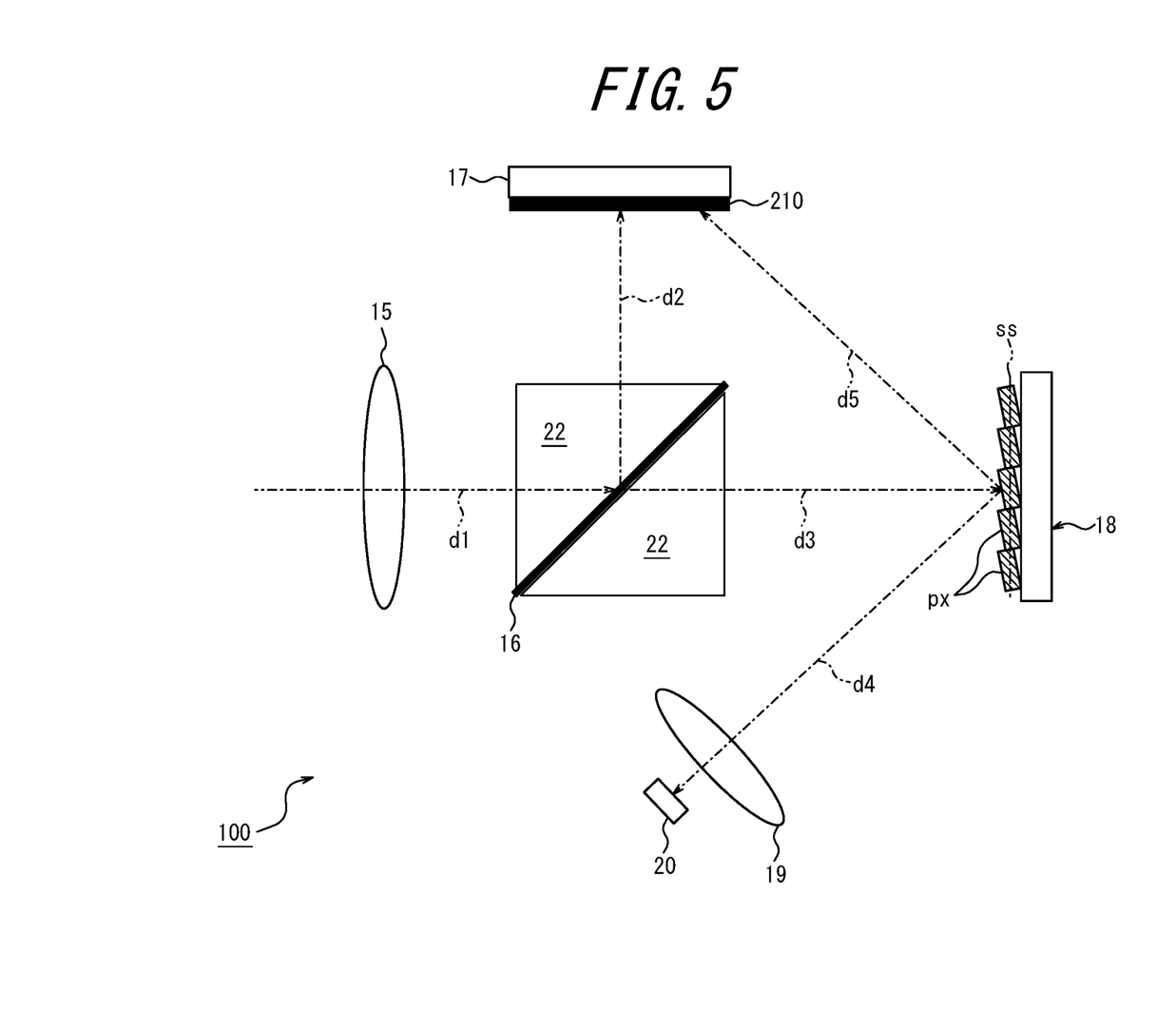
FIG. 5 is a configuration diagram schematically illustrating an electromagnetic wave detection apparatus according to a second embodiment.

Next, an electromagnetic wave detection apparatus according to a second embodiment of the present disclosure is described. In the second embodiment, the arrangement of the blocker differs from the first embodiment. The second embodiment is described below, focusing on the differences from the first embodiment. The same reference signs are used for components with the same configuration as in the first embodiment.

As illustrated in FIG. 5, the electromagnetic wave detection apparatus 100 according to the second embodiment includes a pre-stage optical system 15, a separation unit 16, a first detector 17, a propagation unit 18, a post-stage optical system 19, a second detector 20, and a blocker 210. The configuration of the information acquisition system 11 according to the second embodiment other than the electromagnetic wave detection apparatus 100 is the same as in the first embodiment. The configuration and functions of the pre-stage optical system 15, the separation unit 16, the first detector 17, the propagation unit 18, the post-stage optical system 19, and the second detector 20 in the second embodiment are the same as in the first embodiment. In the second embodiment, the separation unit 16 propagates electromagnetic waves of a particular wavelength in the second direction d2 and propagates electromagnetic waves of another wavelength in the third direction d3.

In the second embodiment, the blocker 210 is disposed on the path of electromagnetic waves propagating from the separation unit 16 in the second direction d2 and on the path of electromagnetic waves propagated from the propagation unit 18 in the fifth direction d5. For example, the blocker covers the detection surface of the first detector 17. The blocker 210 blocks at least a portion of the electromagnetic waves propagated from the propagation unit 18 in the fifth direction d5.

As in the first embodiment, the blocker 210 blocks propagation towards the first detector 17 of at least a portion of the electromagnetic waves propagated in the fifth direction d5 from the propagation unit 18 by absorbing, reflecting, or scattering the electromagnetic waves. The blocker 210 blocks only electromagnetic waves of a different wavelength than the electromagnetic waves propagated in the second direction d2. The blocker 210 transmits or refracts only electromagnetic waves of the same wavelength as the electromagnetic waves propagated in the second direction d2.

As described above, the blocker 210 is disposed to cover the detection surface of the first detector 17 in the electromagnetic wave detection apparatus 100 of the second embodiment. This configuration enables the electromagnetic wave detection apparatus 100 to further reduce the amount of electromagnetic waves incident on the first detector 17 in a wavelength band other than the band allocated to the first detector 17 as a detection target. The electromagnetic wave detection apparatus 100 can therefore further increase the detection accuracy of electromagnetic waves of the wavelength band allocated to the first detector 17.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the disclosure.

For example, in the first embodiment and the second embodiment, the irradiator 12, the scanner 13, and the controller 14 form the information acquisition system 11 along with the electromagnetic wave detection apparatus 10, 100, but the electromagnetic wave detection apparatus 10, 100 may be configured to include at least one of these components.

In the first embodiment and the second embodiment, the propagation unit 18 can switch the propagation direction of the electromagnetic waves incident on the reference surface ss between two directions. Propagation unit 18 may be capable of switching the propagation direction among three or more directions.

In the propagation unit 18 of the first embodiment, the first state is a first reflecting state for reflecting the electromagnetic waves incident on the reference surface ss in the fourth direction d4, and the second state is a second reflecting state for reflecting these electromagnetic waves in the fifth direction d5. This configuration is not, however, limiting.

Figure 6:
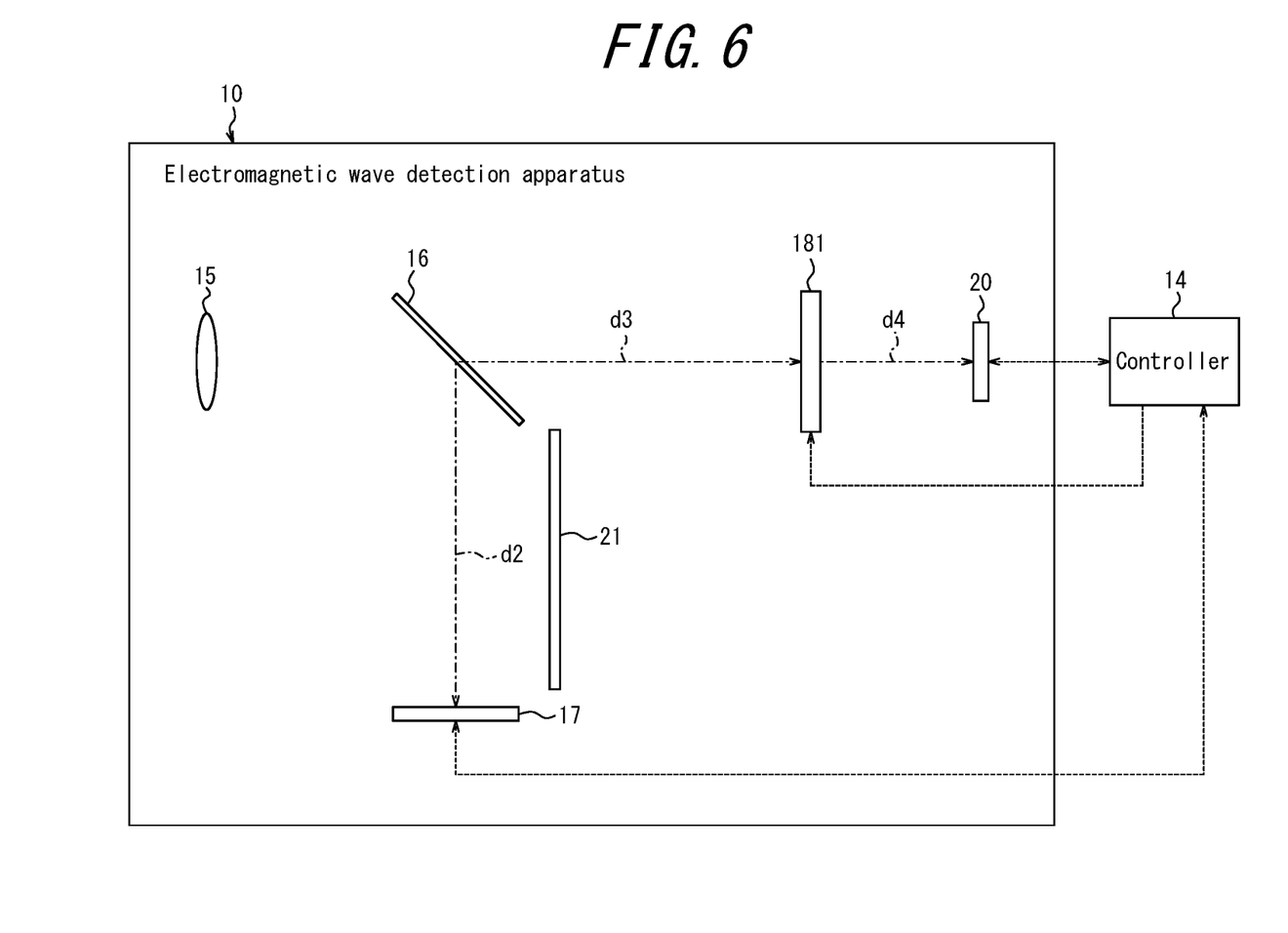
FIG. 6 is a configuration diagram schematically illustrating a modification to the electromagnetic wave detection apparatus according to the first embodiment.

For example, as illustrated in FIG. 6, the first state may be a transmitting state for transmitting the electromagnetic waves incident on the reference surface ss so that the electromagnetic waves propagate in the fourth direction d4. In greater detail, a propagation unit 181 may include a shutter, on each pixel px, that comprises a reflecting surface that reflects electromagnetic waves in the fifth direction d5. The propagation unit 181 with this configuration can open and close the shutter of each pixel px to switch each pixel px between the transmitting state that is the first state and the reflecting state that is the second state.

An example of the propagation unit 181 with such a configuration is a propagation unit that includes a MEMS shutter including a plurality of openable shutters arranged in an array. Another example of the propagation unit 181 is a propagation unit that includes a liquid crystal shutter capable of switching, in accordance with liquid crystal orientation, between the reflecting state for reflecting electromagnetic waves and the transmitting state for transmitting electromagnetic waves. The propagation unit 181 with this configuration can change the liquid crystal orientation of each pixel px to switch each pixel px between the transmitting state that is the first state and the reflecting state that is the second state.

In the first embodiment and the second embodiment, the information acquisition system 11 is configured so that the scanner 13 scans the beam of electromagnetic waves emitted by the irradiator 12, thereby causing the second detector 20 to work together with the scanner 13 and function as a scanning-type active sensor. The information acquisition system 11 is not, however, limited to this configuration. For example, similar effects to those of the first embodiment and the second embodiment can be obtained without inclusion of the scanner 13 when the irradiator 12 includes a plurality of irradiation sources capable of emitting electromagnetic waves radially. This irradiator 12 is configured to function as a scanning-type active sensor by phased scanning in which the irradiator 12 emits electromagnetic waves from each irradiation source while shifting the emission timing. As another example, the information acquisition system 11 can achieve similar effects to those of the first embodiment, without inclusion of the scanner 13, by emitting electromagnetic waves radially from the irradiator 12 and acquiring information without scanning.

In the information acquisition system 11 of the first embodiment and the second embodiment, the first detector 17 is a passive sensor, and the second detector 20 is an active sensor. The information acquisition system 11 is not, however, limited to this configuration. For example, similar effects as in the first embodiment can be achieved in the information acquisition system 11 when the first detector 17 and the second detector 20 are both active sensors or both passive sensors. When the first detector 17 and the second detector 20 are both active sensors, the irradiators 12 that emit electromagnetic waves at the object ob may be different or the same. Furthermore, different irradiators 12 may emit the same type or different types of electromagnetic waves.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in any combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

REFERENCE SIGNS LIST 10, 100 Electromagnetic wave detection apparatus
11 Information acquisition system
12 Irradiator
13 Scanner
14 Controller
15 Pre-stage optical system
16 Separation unit
17 First detector
18, 181 Propagation unit
19 Post-stage optical system
20 Second detector
21, 210 Blocker
22 Prism
d1, d2, d3, d4, d5 First direction, second direction, third direction, fourth direction, fifth direction
ob Object
px Pixel
ss Reference surface

The invention claimed is:

1. An electromagnetic wave detection apparatus comprising:
a separation unit configured to separate electromagnetic waves propagating in a first direction and propagate the electromagnetic waves in a second direction and a third direction;
a first detector configured to detect the electromagnetic waves propagated in the second direction;
a propagation unit comprising a plurality of pixels arranged along a reference surface, the propagation unit being configured to switch a propagation direction of electromagnetic waves that are propagated in the third direction and are incident on the reference surface between a fourth direction and a fifth direction at each pixel;
a second detector configured to detect the electromagnetic waves propagated in the fourth direction; and
a blocker configured to block at least a portion of the electromagnetic waves propagated in the fifth direction,
wherein
the first detector is disposed in the fifth direction relative to the propagation unit;
the blocker is disposed in the fifth direction relative to the propagation unit and is disposed between the propagation unit and the first detector; and
the blocker is disposed between the first detector and the separation unit, causes the electromagnetic waves propagated in the second direction to propagate towards the first detector, and blocks propagation towards the first detector of the electromagnetic waves propagated in the fifth direction.

2. The electromagnetic wave detection apparatus of claim 1, wherein the blocker is disposed on a propagation path of electromagnetic waves propagated in the fifth direction.

3. The electromagnetic wave detection apparatus of claim 2, wherein the blocker is disposed on a path of electromagnetic waves propagated in the fifth direction between the propagation unit and the first detector.

4. The electromagnetic wave detection apparatus of claim 1, wherein the blocker is configured to absorb, reflect, or scatter at least a portion of the electromagnetic waves propagated in the fifth direction.

5. The electromagnetic wave detection apparatus of claim 1, wherein among the electromagnetic waves propagating in the first direction, the separation unit is configured to propagate electromagnetic waves of a particular wavelength in the second direction and to propagate electromagnetic waves of other wavelengths in the third direction.

6. The electromagnetic wave detection apparatus of claim 5, wherein the blocker is configured to block electromagnetic waves of a different wavelength than the electromagnetic waves propagated in the second direction.

7. An information acquisition system comprising:
the electromagnetic wave detection apparatus of claim 1; and
a controller configured to acquire information related to surroundings based on an electromagnetic wave detection result by the first detector and the second detector.

8. The electromagnetic wave detection apparatus of claim 1,
wherein the first detector is disposed in the second direction relative to the separation unit; and
wherein the blocker is disposed in the second direction relative to the separation unit.

9. The electromagnetic wave detection apparatus of claim 8, further comprising:

an irradiator configured to emit electromagnetic waves;
wherein among the electromagnetic waves propagating in the first direction, the separation unit propagates, in the third direction, electromagnetic waves that have a wavelength of reflected waves resulting from reflection, by an object, of the electromagnetic waves emitted by the irradiator; and
wherein among incident electromagnetic waves, the propagation unit propagates the reflected waves in the fourth direction and propagates the electromagnetic waves other than the reflected waves in the fifth direction.

10. The electromagnetic wave detection apparatus of claim 9, wherein the electromagnetic wave detection apparatus measures distance from the object based on detection of the reflected waves by the second detector.

11. The electromagnetic wave detection apparatus of claim 10, wherein the blocker is configured to cover a detection surface of the first detector.

12. The electromagnetic wave detection apparatus of claim 11, further comprising an optical system configured to form an image on the propagation unit and the first detector from the electromagnetic waves propagating in the first direction.

\* \* \* \* \*